United States Patent
Galligan et al.

(10) Patent No.: US 8,062,990 B2
(45) Date of Patent: Nov. 22, 2011

(54) METAL CATALYST CARRIERS AND CATALYST MEMBERS MADE THEREFROM

(75) Inventors: Michael P. Galligan, Clark, NJ (US); Joseph C. Dettling, Howell, NJ (US); Shau-Lin F. Chen, Piscataway, NJ (US); Matthew P. Larkin, Lambertville, NJ (US)

(73) Assignee: BASF Corporation, Florham Park, NJ (US)

( * ) Notice: Subject to any disclaimer, the term of this patent is extended or adjusted under 35 U.S.C. 154(b) by 634 days.

(21) Appl. No.: 10/612,658

(22) Filed: Jul. 2, 2003

(65) Prior Publication Data
US 2004/0038819 A1 Feb. 26, 2004

Related U.S. Application Data

(63) Continuation of application No. 09/586,445, filed on Jun. 2, 2000, now abandoned, which is a continuation-in-part of application No. 09/301,626, filed on Apr. 29, 1999, now abandoned, which is a continuation-in-part of application No. 09/071,663, filed on May 1, 1998, now abandoned.

(51) Int. Cl.
*B01J 23/10* (2006.01)
*B01J 23/26* (2006.01)

(52) U.S. Cl. ........ 502/300; 502/302; 502/305; 502/313; 502/314; 502/315; 502/316; 502/319; 502/320; 502/323; 502/325; 502/337; 502/338; 502/439; 502/527.24

(58) Field of Classification Search .............. 502/300, 502/302, 305, 313–316, 319, 320, 323, 325, 502/337, 338, 439, 527.25
See application file for complete search history.

(56) References Cited

U.S. PATENT DOCUMENTS 3,111,396 A 11/1963 Ball ............................. 25/156
(Continued)

FOREIGN PATENT DOCUMENTS
EP 0 639 702 A1 2/1995
(Continued)

OTHER PUBLICATIONS

E. Luccini et al, "Preparation of zirconia-ceria powders by coprecipitation of a mixed zirconium carbonate in water with urea", Int. J. of Materials and Product Technology, vol. 4, No. 2, 1989, pp. 167-175.

(Continued)

*Primary Examiner* — Ngoc-Yen M Nguyen
(74) *Attorney, Agent, or Firm* — Scott S. Servilla; Diehl Servilla LLC; Melanie L. Brown (57) ABSTRACT

A pliable refractory metal carrier (46) may have coated thereon an anchor layer (47) to improve adherence to the carrier (46) of a catalytic coating (48). The conformable catalyst member (26, 82, 82', 126, 226, 326) may be bent to conform to a curved or bent exhaust pipe (20, 220, 320) within which it is mounted. The pliable metal carrier may be in the form of a tube such as carrier (46) having perforations (54) formed therein, or it may be a metal strip (76) which is folded into accordion pleats (80) and has perforations (78) formed therein. The perforations (54, 78) serve to permit the passage of exhaust gas therethrough. A series of interior closures (58) and annular baffles (60) may be provided to import a serpentine flow path to gases flowed through an exhaust pipe (22) containing a conformable catalyst member (226) therein. A mounting member (68) may be supplied to fasten one end of the conformable catalyst member (226) to the discharge end of an exhaust pipe (220).

18 Claims, 7 Drawing Sheets

U.S. PATENT DOCUMENTS

| | | | |
|---|---|---|---|
| 3,540,878 A | 11/1970 | Levine et al. | 75/5 |
| 3,667,985 A | 6/1972 | Levine et al. | 117/22 |
| 3,925,259 A | 12/1975 | Kane | 252/470 |
| 4,027,367 A | 6/1977 | Rondeau | 428/652 |
| 4,094,644 A | 6/1978 | Wagner | 23/288 F |
| 4,305,910 A * | 12/1981 | Kudo et al. | 422/177 |
| 4,318,894 A | 3/1982 | Hensel et al. | 423/212 |
| 4,414,023 A | 11/1983 | Aggen | 75/124 |
| 4,451,441 A | 5/1984 | Ernest et al. | 423/213.2 |
| 4,455,281 A * | 6/1984 | Ishida et al. | 423/239.1 |
| 4,515,758 A | 5/1985 | Domesle et al. | 423/213.2 |
| 4,530,418 A | 7/1985 | Currie | 181/227 |
| 4,617,289 A | 10/1986 | Saito et al. | 502/339 |
| 4,671,931 A | 6/1987 | Herchenroeder et al. | 420/445 |
| 4,719,680 A * | 1/1988 | Cyron | 29/890 |
| 4,752,599 A | 6/1988 | Nakamura et al. | 502/257 |
| 4,798,770 A * | 1/1989 | Donomoto et al. | 428/547 |
| 4,920,746 A | 5/1990 | Gebelius | 60/299 |
| 4,927,353 A | 5/1990 | Nomura et al. | 431/215 |
| 4,963,440 A * | 10/1990 | Shimogori et al. | 428/651 |
| 4,969,329 A | 11/1990 | Bolton et al. | 60/288 |
| 4,985,388 A | 1/1991 | Whittenberger | 502/439 |
| 4,987,112 A * | 1/1991 | Engler et al. | 502/255 |
| 5,075,274 A | 12/1991 | Kiyohide et al. | 502/303 |
| 5,108,977 A | 4/1992 | Yoshida et al. | 502/304 |
| 5,151,254 A | 9/1992 | Arai et al. | 422/180 |
| 5,170,624 A | 12/1992 | Cornelison et al. | 60/300 |
| 5,204,302 A | 4/1993 | Gorynin et al. | 502/2 |
| 5,208,203 A | 5/1993 | Horiuchi et al. | 502/302 |
| 5,384,200 A | 1/1995 | Giles et al. | 428/552 |
| 5,419,121 A | 5/1995 | Sung et al. | 60/274 |
| 5,449,443 A * | 9/1995 | Jacoby et al. | 588/206 |
| 5,466,651 A | 11/1995 | Pfefferle | 502/304 |
| 5,481,084 A | 1/1996 | Patrick et al. | 219/123 |
| 5,516,494 A | 5/1996 | Domesle et al. | 427/243 |
| 5,569,455 A | 10/1996 | Fukui et al. | 422/174 |
| 5,597,771 A | 1/1997 | Hu et al. | 502/304 |
| 5,713,906 A * | 2/1998 | Grothues-Spork et al. | 606/99 |
| 5,721,188 A | 2/1998 | Sung et al. | 502/439 |
| 5,735,158 A | 4/1998 | Brunson | 72/196 |
| 5,987,882 A | 11/1999 | Voss et al. | 60/274 |
| 6,042,879 A * | 3/2000 | Draghi et al. | 427/142 |
| 6,221,075 B1 * | 4/2001 | Tormala et al. | 606/77 |
| 6,294,141 B1 | 9/2001 | Twigg et al. | 423/213.7 |
| 6,479,428 B1 * | 11/2002 | Tonkovich et al. | 502/302 |
| 6,607,844 B1 * | 8/2003 | Araga et al. | 428/624 |
| 2001/0006008 A1 * | 7/2001 | Dean et al. | 73/864 |

FOREIGN PATENT DOCUMENTS

| | | |
|---|---|---|
| EP | 0 831 211 A1 | 3/1998 |
| FR | 2 527 684 | 12/1983 |
| GB | 413744 | 7/1926 |
| GB | 1014198 | 12/1965 |
| GB | 1014498 | 12/1965 |
| GB | 2 188 559 A | 10/1987 |
| GB | 2188559 A | 10/1987 |
| JP | 07-148440 | 6/1995 |
| TW | 162311 | 7/1991 |
| WO | WO 97/07327 | 2/1997 |
| WO | WO 98/15354 | 4/1998 |
| WO | WO 99/56853 | 11/1999 |

OTHER PUBLICATIONS

Nakatsuji et al, "highly Durable $NO_x$ Reduction System and Catalysts for $NO_x$ Storage Reduction System", Society of Automotive Engineers, Inc., SAE paper No. 980932, pp. 129-134, 1988.

Kisenyi et al, "Correlation Between Dynamometer- and Vehicle-Aged Catalysts for Automotive Lean-Burn Applications", Society of Automotive Engineers, Inc., SAE paper No. 980934, pp. 145-152, 1988.

A. Jatkar, "A New Catalyst Support Structure for Automotive Catalytic Converters", SAE Technical Paper Series No. 971032, Int'l Congress & Exposition, Detroit, Michigan, Feb. 24-27, 1997, pp. 149-186.

A.N. Pestryakov, "Catalysts Based on Foam Metals", Materials and Ecology, Journal of Advanced Materials, 1994, 1(5), pp. 471-476.

Palke, D.R. et al, "Durable Catalytic Aftertreatment of Motorcycle Exhaust", SAE paper 962473, Symposium on International Automotive Technology '96, pp. 2029-2036.

Reck et al, "Metallic Substrates and Hot Tubes for Catalytic Converters in Passenger Cars, Two- and Three-Wheelers", SAE Paper 962473, Dec. 1996, Abstract only.

M. Mitchell, "Ampormat Porous Materials; Series 200", Astro Met, Inc. Apr. 8, 1998.

OptiCat Marketing Brochure, "Wire Mesh Catalyst Carrier".

Tetko Marketing Brochure, "Wire Cloth", p. 36.

"Thermal Barrier coating" with English translation of pertinent paragraph.

* cited by examiner

METAL CATALYST CARRIERS AND CATALYST MEMBERS MADE THEREFROM

CROSS-REFERENCE TO RELATED APPLICATIONS

This application is a continuation of application Ser. No. 09/586,445, filed Jun. 2, 2000 now abandoned and entitled "PLIABLE METAL CATALYST CARRIERS, CONFORMABLE CATALYST MEMBERS MADE THEREFROM AND METHOD OF INSTALLING THE SAME", which in turn is a continuation-in-part of application Ser. No. 09/301,626, filed Apr. 29, 1999 now abandoned and entitled "CATALYST MEMBERS HAVING ELECTRIC ARC SPRAYED SUBSTRATES AND METHODS OF MAKING THE SAME", which is in turn a continuation-in-part of Ser. No. 09/071,663, filed May 1, 1998 now abandoned and entitled "CATALYST MEMBERS HAVING ELECTRIC ARC SPRAYED SUBSTRATES AND METHODS OF MAKING THE SAME".

BACKGROUND OF THE INVENTION

1. Field of the Invention

The present invention relates to pliable refractory metal carriers on which a catalyst composition may be coated to provide conformable catalyst members. More particularly, the present invention relates to refractory metal carriers which may be coated with a catalytic composition and then bent to enable insertion of the resulting conformable catalyst into curved conduits and the like, for example, into curved exhaust manifolds or exhaust pipes of gasoline or diesel internal combustion engines.

2. Related Art

The provision of catalysts to treat exhaust gases, such as exhaust gases of internal combustion engines, is, of course, well known in the art. Typically, such catalysts comprise a rigid carrier, such as the so-called "honeycomb"-type carrier, comprising a ceramic-like substance, such as cordierite or mullite, usually of circular or oval cylindrical shape and having a plurality of fine gas flow passages extending from and through the front to the rear face thereof. The walls of these gas flow passages are coated with a catalytic material such as one comprised of a dried, calcined coating of fine particulate refractory metal oxide, e.g., activated alumina, on which is dispersed one or more catalytic metal components. The latter may be, for example, one or more of platinum, platinum plus rhodium, and one or more multi-valent base metal oxides such as oxides of cobalt, nickel, iron or manganese. It is also known in the art to use a carrier comprised of a pair of overlying refractory metal strips, such as stainless steel strips, one flat and one corrugated. The overlying strips are tightly wound into a cylinder so that the alternating corrugated and flat metal strips form a plurality of fine gas flow passages extending from and through the front to the rear face of the metal support. A catalytic material such as described above may be coated onto these gas flow passages, e.g., from an aqueous slurry of the particles, dried and calcined. In either case, whether extruded from a ceramic-like material or fashioned from tightly spiral-wound strips of flat and corrugated metal, the resulting carrier body is rigid. In order to provide sufficient catalytic material to effectuate purification of the exhaust stream being treated, such rigid catalyst members are typically of significantly larger diameter than the exhaust stream conduits in which they are placed. Therefore, it is well known in the art to encase such rigid catalyst members within a canister, such as a stainless steel canister, adding inlet and outlet ends which are of truncated conical configuration, the larger base of the truncated conical ends being attached to a cylindrical housing which contains the rigid catalyst member. The smaller ends of the truncated conical end sections face away from the rigid catalyst member and are sized to be conveniently connected, respectively, to inlet and outlet conduits which flow the exhaust stream into and carry it from the rigid catalyst member.

The foregoing construction is old and well known in the art. It is also known in the art that the application of such catalytic materials to metal substrates is enhanced by the application of an intermetallic compound to the metal substrate as an intermediate coating between the metal and a catalytically active layer. For example, such an arrangement is shown in U.S. Pat. No. 5,204,302, issued Apr. 20, 1993 to I. V. Gorynin et al, and entitled "Catalyst Composition and a Method For Its Preparation" ("the '302 Patent"). The '302 Patent discloses a multi-layered catalyst material supported on a metal substrate. The metal substrate (column 4, lines 64-68) may be any thermally stable metal including stainless steel and low alloy steel. As illustrated in FIG. 1 of the Patent and described at column 4, line 32 et seq, a flame spraying or plasma spraying apparatus (FIG. 2 and column 5, line 32 et seq) is used to apply an adhesive sublayer 12 to metal substrate 11, which is shown in solid cross section as a dense (solid) plate-like structure. Adhesive sublayer 12 contains a self-bonding intermetallic compound formed from any one of a number of metal pairings, including aluminum and nickel, as described at column 5, lines 1-6 of the '302 Patent. A catalytically active layer 14 (FIG. 1) is sprayed atop the sublayer 12 and has a gradient composition with an increasing content of catalytically active material as one proceeds away from the interface (column 5, lines 7-24). The catalytically active layer can be alumina, preferably gamma-alumina, and may further include specified metal oxide stabilizers such as CaO, $Cr_2O_3$, etc., and metal oxide catalytic materials such as $ZrO_2$, $Ce_2O_3$, etc. A porous layer 18 (FIG. 1 and column 5, lines 25-32) contains some catalytically active components and transition metal oxides as decomposition products of pore-forming compounds such as $MnCO_3$, $Na_2CO_3$, etc. An optional activator coating 19 may be applied onto the porous layer, preferably by magnetron sputtering (see column 4, lines 56-63 and column 8, lines 24 et seq).

So-called "metal foams" and their use as a substrate or carrier for catalysts used in the treatment of automotive exhaust gases are also known in the art. For example, U.S. Pat. No. 3,111,396 to Ball, dated Nov. 19, 1963, discloses a method for making a porous "metal foam". Essentially, the method comprises forming a porous organic structure such as a mesh, cloth, or a cured foam structure such as an open pore sponge, impregnating the structure with a fluid suspension of powdered metal in a liquid vehicle, and drying and heating the impregnated structure to remove the liquid vehicle and then further heating the organic structure to decompose it and to sinter the metal powder into a continuous form. The resulting metallic structure, while not foamed during the manufacturing process, is nevertheless described as foamed because its ultimate structure resembles that of a foamed material.

SAE (Society of Automotive Engineers) Technical Paper 971032, entitled *A New Catalyst Support Structure For Automotive Catalytic Converters* by Arun D. Jatkar, was presented at the International Congress and Exposition, Detroit, Mich., Feb. 24-27, 1997. This Paper discloses the use of metal foams as a substrate for automotive catalysts and notes that foams made from FeCrAlloy and ALFA-IV® ferritic stainless steel powders were said to be successful, at least in preliminary tests, for use as substrates for automotive catalysts. A ceramic washcoat having a precious metal loading was deposited onto disks of ALFA-IV® metal foam produced by Astro Met, Inc. The washcoat comprised gamma-alumina and cerium oxide on which platinum and rhodium in a ratio of 4:1 were dispersed to provide a loading of 40 grams of the precious metal per cubic foot of the foam-supported catalyst. Such catalyzed substrates were said to be effective in treating hydrocarbon emissions.

In an article entitled "Catalysts Based On Foam Metals", published in *Journal of Advanced Materials*, 1994, 1(5) 471-476, Pestryakov et al suggest the use of foamed metal as a carrier substrate for catalytic materials for the catalytic neutralization of exhaust gases of car engines. The use of an intermediate layer of high surface area alumina between the metallic foam and the catalytic material is recommended, by direct deposition on the foam carrier. In addition to increasing the surface area of the substrate, the alumina is also credited with protecting the surface of the substrate against corrosion.

SAE Paper 962473 by Reck et al of EMITECH, GmbH, entitled "Metallic Substrates and Hot Tubes For Catalytic Converters in Passenger Cars, Two- and Three-Wheelers" addresses the use of catalytic converters and hot tubes to treat the exhaust of scooters and motorcycles, especially those having two-stroke engines.

Wire mesh carriers for catalytic materials are commercially available and comprise wire that has been plasma spray coated to form a rough surface thereon to improve the adherence of a catalytic material deposited thereon.

SUMMARY OF THE INVENTION

Generally, the present invention relates to a pliable refractory metal carrier for a catalytic material. The pliable carrier, coated with a catalytic material to provide a conformable catalytic member, may be bent or folded to permit insertion of the conformable catalytic member into restricted and curved or bent areas, such as curved portions of the exhaust conduit of an internal combustion engine. The conformable catalyst member may readily be inserted into areas which are not normally accessible to conventional rigid catalyst members. The present invention also provides a method of installing such conformable catalyst members, taking advantage of the pliable, conformable nature of the carriers. In some cases, the uncatalyzed pliable carriers may be inserted into curved or restricted portions of an exhaust conduit or the like, to serve as a flame arrestor.

Specifically, in accordance with the present invention there is provided a pliable refractory metal carrier, which optionally may have a plurality of perforations formed therein, and having coated thereon an anchor layer, e.g., an intermetallic anchor layer, capable of receiving a catalytic coating and retaining the catalytic coating intact on the carrier when the pliable carrier is bent.

In a related aspect of the present invention the pliable carrier may be in the shape of a tube, e.g., a tube of corrugated construction.

One aspect of the present invention provides a pliable refractory metal carrier comprising the following components: (a) a length of pliable tube having (i) an exterior surface, (ii) an interior surface which defines a tube passageway, and (iii) a plurality of perforations extending along at least a portion of the length of the tube; (b) one or more annular baffles extending radially outwardly from the exterior surface of the tube; and (c) one or more interior closures closing the tube passageway but leaving at least some of the perforations open. The annular baffles and the interior closures are staggered relative to each other along the length of the tube, and the perforations are disposed along the length of the tube at least coextensively with the annular baffles and the interior closures.

In accordance with another aspect of the present invention, there is provided a refractory metal carrier, at least part of which is dimensioned and configured to be mounted within a pipe having an open discharge end, the carrier having coated thereon an anchor layer, e.g., an intermetallic anchor layer, for having a catalytic coating applied thereto. The carrier has a distal end and a proximal end, and the proximal end comprises a mounting member dimensioned and configured to be secured to the open discharge end of the pipe when at least a part of the carrier is disposed within the pipe.

In a related aspect, the present invention provides that the aforesaid mounting member comprises an annular collar defining a mounting flange which is disposed radially outwardly of the proximal end of the catalyst member and extends in the direction from the proximal end towards the distal end thereof. By virtue of this construction, there is defined between the mounting flange and the proximal end of the catalyst member an annular slot which is dimensioned and configured to receive therein the open discharge end of the pipe, when at least a part of the carrier is disposed within the pipe.

Still another related aspect of the present invention provides that a catalyst member is comprised of the refractory metal carrier having a catalytic material coated on at least some of that part of the carrier which is dimensioned and configured to be disposed within the pipe.

Yet another aspect of the present invention provides a conformable catalyst member comprising the following components: (a) a pliable refractory metal carrier in the form of a length of tube having (i) an exterior surface, (ii) an interior surface which defines a tube passageway and (iii) a plurality of perforations extending along at least a portion of the length thereof; (b) one or more annular baffles extending radially outwardly from the exterior surface of the tube; (c) one or more interior closures closing the tube passageway but leaving at least some of the perforations open; and (d) a first catalytic material carried on the carrier.

Another aspect of the present invention provides an assembly of a conformable catalyst member as described above and a conduit having an interior surface, the conformable catalyst member being disposed within the conduit to define an annular space between the exterior surface of the pliable carrier and the interior surface of the conduit. The annular baffles are dimensioned and configured to close the annular space and the perforations are disposed at least co-extensively with the annular baffles along the length of the pliable carrier.

A method aspect of the present invention calls for installing a conformable catalyst member into a pipe having an open discharge end and at least one curved longitudinal segment thereof. The catalyst member comprises a pliable refractory metal carrier on which a catalytic material is coated, the catalyst member having a distal end and a proximal end, and the method comprising the following steps. The distal end of the catalyst member is inserted into the open discharge end of the pipe and the catalyst member is advanced through the pipe, including bending the catalyst member to conform it to the curvature of the curved longitudinal segment of the pipe to disposed the proximal end of the catalyst member adjacent to the discharge end of the pipe. The catalyst member is then secured to the pipe.

Another method aspect of the present invention provides a method of installing a catalyst member into a pipe having an open discharge end. The catalyst member comprises a refractory metal carrier having a catalytic coating thereon, and has a distal end and a proximal end. The proximal end has a mounting member dimensioned and configured to be secured to the open discharge end of the pipe when at least a part of the carrier is disposed within the pipe, and the method comprises the following steps. The distal end of the catalyst member is inserted into the open discharge end of the pipe and the catalyst member is advanced through the pipe to align the discharge end of the pipe with the mounting member. The mounting member is then secured to the discharge end of the pipe.

In the foregoing method, the mounting member may comprise an annular collar defining a mounting flange which is disposed radially outwardly of the proximal end of the catalyst member and extends in the direction from the proximal end towards the distal end thereof. In this way there is defined between the mounting flange and the proximal end of the catalyst member an annular slot which is dimensioned and configured to receive therein the open discharge end of the pipe. The step of advancing the catalyst member through the pipe includes disposing the discharge end of the pipe within the annular slot, and the mounting member may be secured to the discharge end of the pipe by securing the mounting flange to the discharge end of the pipe.

Yet another method aspect of the present invention provides a method of installing a conformable catalyst member at a selected location in the interior of an exhaust conduit of a source of an exhaust stream, e.g., the exhaust conduit of an internal combustion engine, the selected location being accessible via an entry way thereto. The conformable catalyst member comprises at least one pliable refractory metal carrier having a catalytic coating thereon. The method comprises the steps of inserting the conformable catalyst member into the entryway and advancing it to the selected location by bending the conformable catalyst member to conform it to the shape of the selected location.

DETAILED DESCRIPTION OF THE INVENTION AND PREFERRED EMBODIMENTS THEREOF

Figure 1:
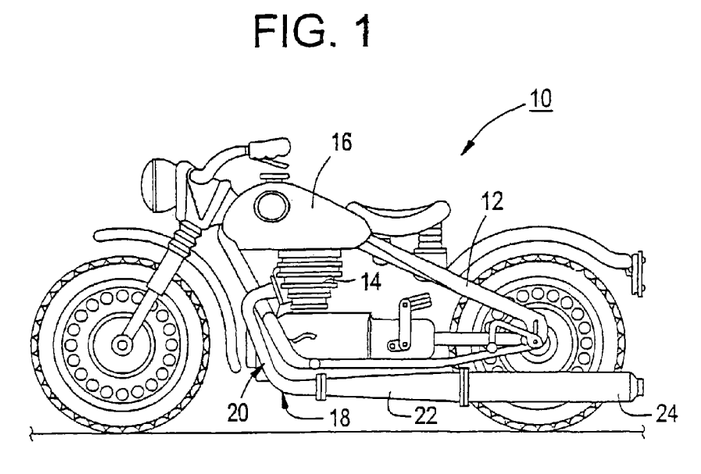
FIG. 1 is a side view in elevation of an otherwise conventional motorcycle, the exhaust system of which is equipped with a conformable catalyst member (not visible in FIG. 1) in accordance with one embodiment of the present invention.
Figure 1A:
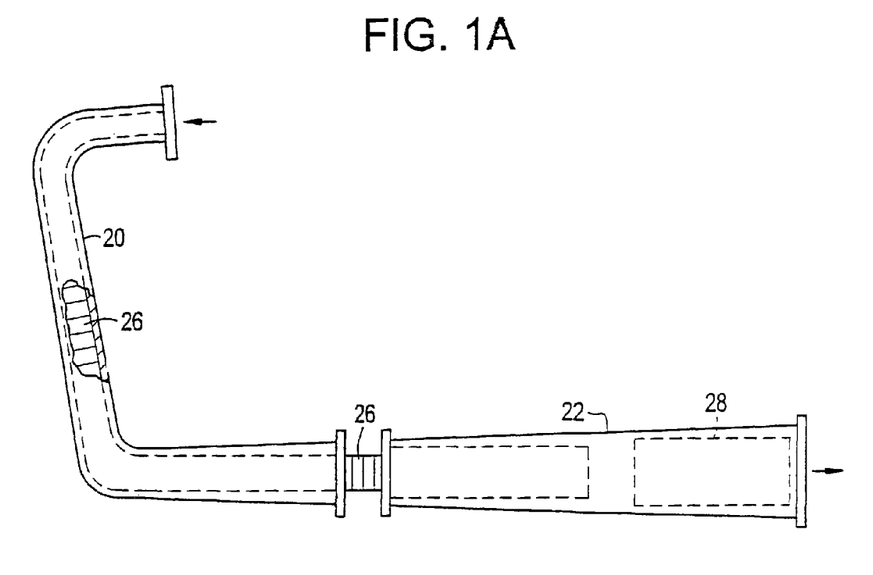
FIG. 1A is an exploded view, partly in cross section, of a portion of the exhaust system of the motorcycle of FIG. 1 showing, partially in phantom outline, a conformable catalyst member in accordance with one embodiment of the present invention.

FIG. 1 shows a motorcycle 10 conventionally comprised of a frame 12 on which is mounted a conventional gasoline engine 14 supplied with fuel in the usual manner from a fuel tank 16. An exhaust system 18 is comprised of an exhaust pipe 20, a catalyst housing 22 and a tailpipe 24. FIG. 1A shows an enlarged, exploded view of exhaust pipe 20 and catalyst housing 22, a portion of exhaust 20 being broken away to provide a partial view of a conformable catalyst member 26 in accordance with one embodiment of the present invention. A conventional, prior art rigid catalyst member 28 is shown in phantom outline positioned downstream of conformable catalyst member 26 as sensed in the direction of exhaust gas flowing through exhaust system 18 in the direction of the unnumbered arrows in FIG. 1A. Conformable catalyst member 26 is pliable so that it may be inserted into exhaust pipe 20 and bent to conform to the curved construction thereof. In the illustrated embodiment, conformable catalyst member 26 extends through substantially the entire length of exhaust pipe 20, thence into a portion of catalyst housing 22. Details of the construction of a conformable catalyst member in accordance with the present invention, such as conformable catalyst member 26, are provided below.

Tailpipe 24 may contain another catalyst member, including a conformable catalyst member in accordance with the present invention and, alternately or in addition, may contain a conventional muffler to quiet engine noise.

Figure 2:
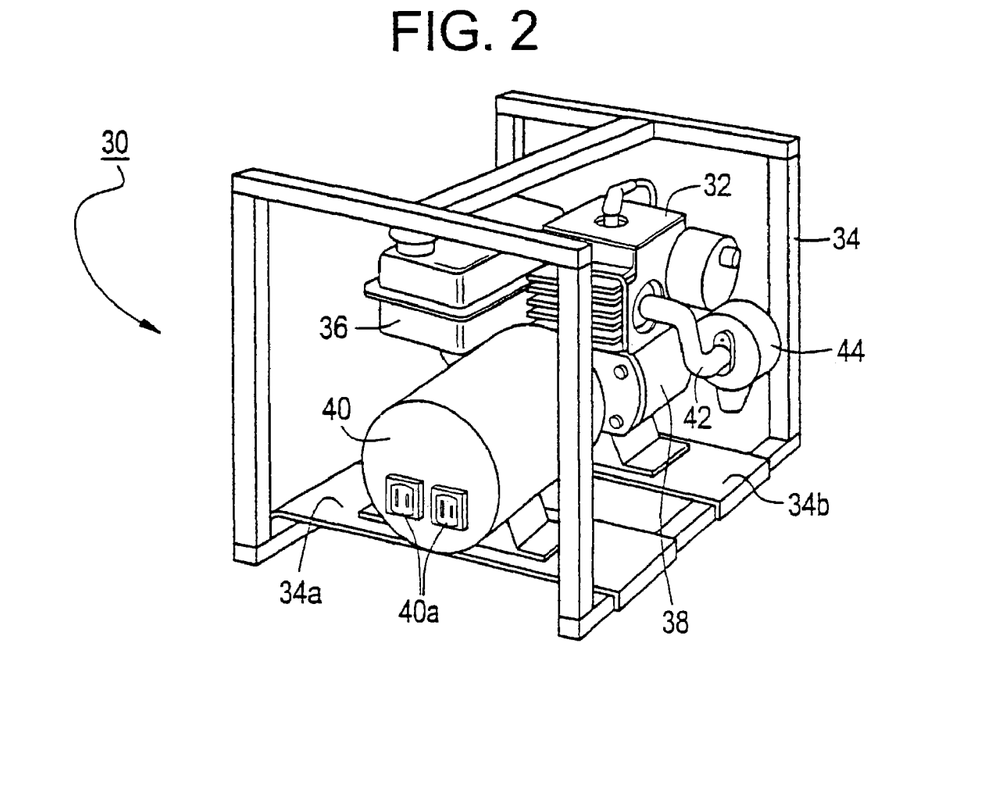
FIG. 2 is a perspective view of an otherwise conventional gasoline engine-powered portable electric generator, the exhaust conduit of which is fitted with a conformable catalyst member (not visible in FIG. 2) in accordance with one embodiment of the present invention.
Figure 2A:
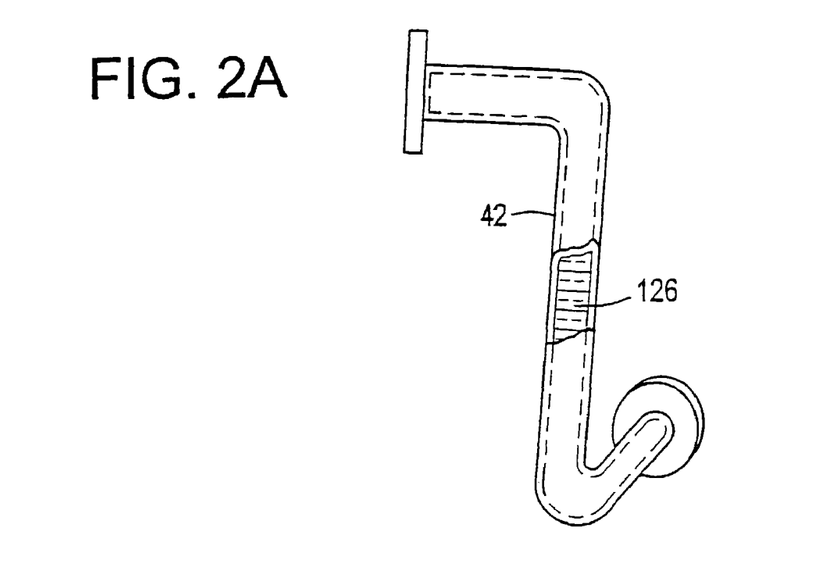
FIG. 2A is a perspective view, partly broken away, showing the engine exhaust conduit of the generator of FIG. 2 with a conformable catalyst member in accordance with another embodiment of the present invention installed therein.

FIG. 2 shows another environment of use of the conformable catalyst members of the present invention comprising a portable electric generator 30 of conventional construction comprising a small gasoline or diesel engine 32 mounted on platforms 34a, 34b of support frame 34. Engine 32 is supplied with fuel in the known manner from a fuel tank 36 and drives a transmission unit 38 which in turn drives an electric generator 40, which supplies electrical power through conventional outlets 40a. An exhaust pipe 42 leads from engine 32 to a muffler 44 from which the exhaust is expelled to the atmosphere. FIG. 2A is an enlarged perspective view of exhaust pipe 42 which is partially broken away to show therein a conformable catalyst member 126 in accordance with another embodiment of the invention. Conformable catalyst member 126 may be of any suitable type in accordance with the practices of the present invention, including the types described in more detail below. FIG. 2A illustrates how the conformable catalyst member 126 may be bent to follow the twisting contours of exhaust pipe 42.

Figure 3:
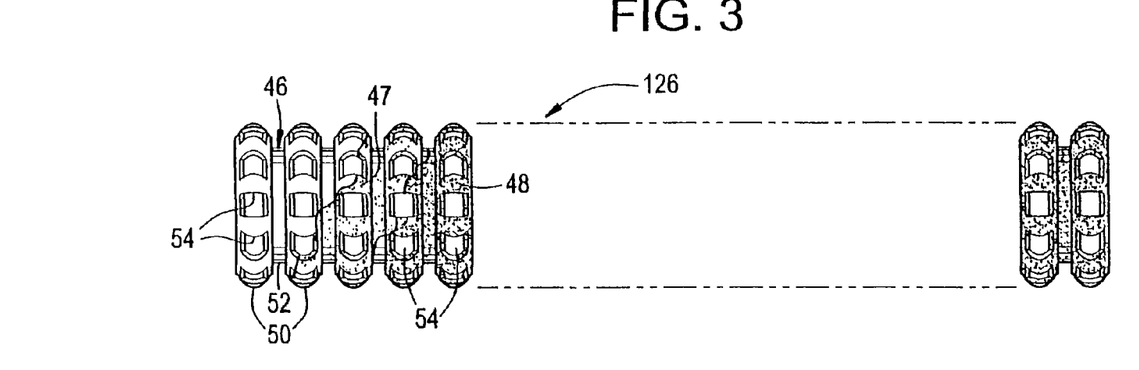
FIG. 3 is an elevation view, with parts broken away, of a pliable refractory metal carrier in accordance with one embodiment of the present invention.
Figure 3A:
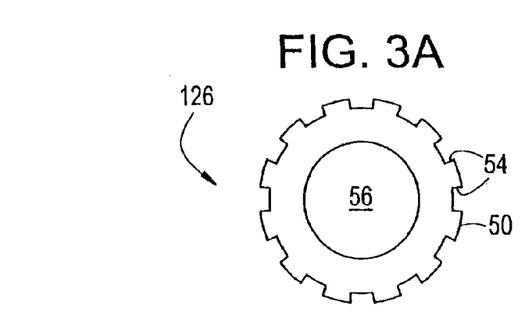
FIG. 3A is an end view thereof.
Figure 3B:
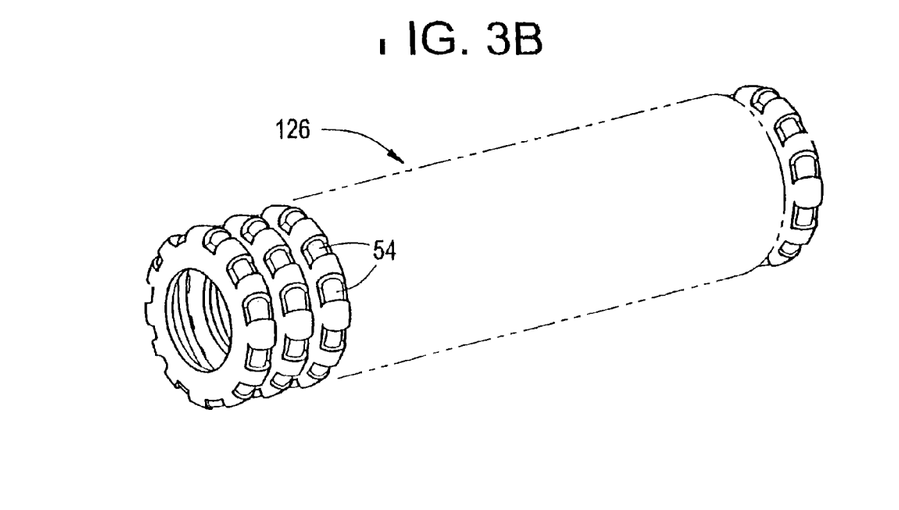
FIG. 3B is a perspective view of the pliable refractory metal carrier of FIG. 3.

FIGS. 3, 3A and 3B illustrate a conformable catalyst member 126, which represents one embodiment of a conformable catalyst member in accordance with the present invention. Conformable catalyst member 126 is comprised of a pliable, refractory metal carrier 46 which, in the illustrated embodiment, is of corrugated tubular construction and has coated thereon an anchor layer 47 which serves to enhance the strength of adhesion to metal carrier 46 of catalytic coating 48, which is coated onto anchor layer 47. Portions of anchor layer 47 and catalytic coating 48 are broken away at the left-hand side (as viewed in FIG. 3) of conformable catalyst member 126 to show an uncoated portion of pliable refractory metal carrier 46 and a portion of anchor layer 47. Anchor layer 47 may be any suitable anchor layer which is effective to enhance the adherence of catalytic coating 48 sufficiently so that upon bending or flexing of conformable catalyst member 126 to insert it within curved or bent passageways, catalytic coating 48 does not separate from conformable catalyst member 126. Typical curved or bent passageways are illustrated by exhaust pipes 20 and 42 of FIGS. 1A and 2A, respectively.

Suitable and preferred anchor layers are intermetallic anchor layers as disclosed in the aforesaid parent application Ser. No. 09/301,626. Such anchor layers may be deposited by electric arc spraying onto the pliable refractory metal carrier a metal feedstock selected from the group consisting of nickel, Ni/Cr/Al/Y, Co/Cr/Al/Y, Fe/Cr/Al/Y, Co/Ni/Cr/Al/Y, Fe/Ni/Cr, Fe/Cr/Al, Ni/Cr, Ni/Al, 300 series stainless steels, 400 series stainless steels, Fe/Cr and Co/Cr, and mixtures of two or more thereof. In one embodiment, the anchor layer may comprise nickel and aluminum. The aluminum may comprise from about 3 to 10 percent, optionally from about 4 to 6 percent, of the combined weight of nickel and aluminum in the anchor layer.

The catalytic coating 48 is deposited on the anchor layer and may comprise a refractory metal oxide support, e.g., alumina or ceria, on which one or more catalytic metal components, e.g., one or more of platinum, rhodium and palladium, are dispersed.

The strong bond of an anchor layer achieved by electric arc spraying permits the resulting conformable catalyst members, comprised of pliable (i.e., malleable and/or flexible) anchor layer-coated refractory metal carriers to be bent, compressed, folded, rolled, curved, etc., after the anchor layer 47 and catalytic coating 48 are deposited thereon. Likewise, foamed metal having an anchor layer 47 thereon and a catalytic coating 48 over the anchor layer, may be bent, compressed, curved, etc., to change its shape to accommodate insertion into curved or bent portions of an exhaust pipe.

Figure 6:
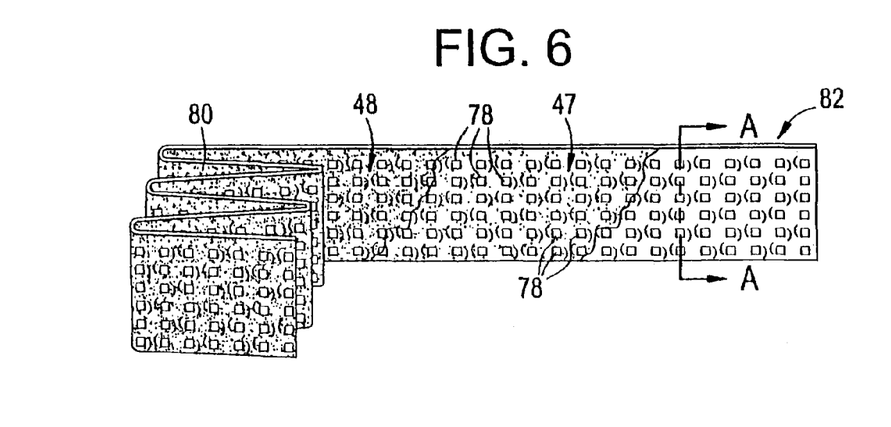
FIG. 6 is a perspective view of a partially formed conformable catalyst member in accordance with yet another embodiment of the present invention.
Figure 6A:
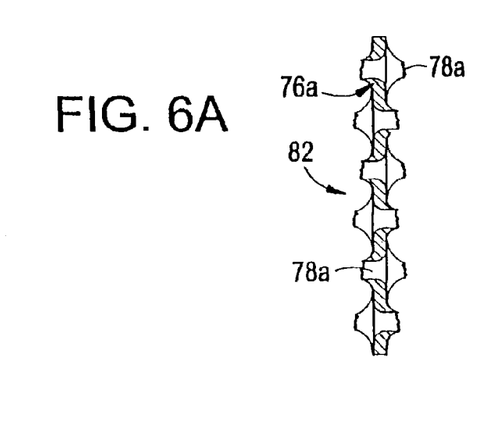
FIG. 6A is a view taken along line A-A of FIG. 6.

Although the pliable refractory metal carrier, such as pliable refractory metal carrier 46 or conformable catalyst member 82 illustrated in FIGS. 6 and 6A, will normally have a catalyst coating thereon, it is possible to utilize the pliable refractory metal carrier in uncatalyzed form as a flame arrestor. Such use of an uncatalyzed pliable refractory metal carrier provides the ability to insert a flame arrestor within or through a curved or bent portion of an exhaust pipe or other conduit. For example, in some embodiments, only a portion of the pliable refractory metal carrier may have a catalyst coating (and an optional intermediate anchor layer) coated thereon, and a portion thereof may be left uncatalyzed to serve as a flame arrestor and/or to aid in temperature control by providing a mass of uncatalyzed metal to be contacted by the gas being flowed thereover.

Conformable catalyst member 126 is, as mentioned above, of corrugated construction having alternating rings 50 separated by annular webs 52. There is a series of perforations 54 spaced apart from each other and extending radially around the periphery of each of rings 50. As best seen in the end view of FIG. 3A, conformable catalyst member 126 essentially comprises a perforated, corrugated tube which defines a tube passageway 56. Refractory metal carrier 46 is made of a suitable refractory material, such as stainless steel, FeCrAlloy or the like, and has a wall thickness which, in conjunction with the corrugated construction, enables conformable catalyst member 126 to be bent to conform to curves and bends, such as those of exhaust pipe 20 (FIG. 1A) and exhaust pipe 42 (FIG. 2A).

Figure 4:
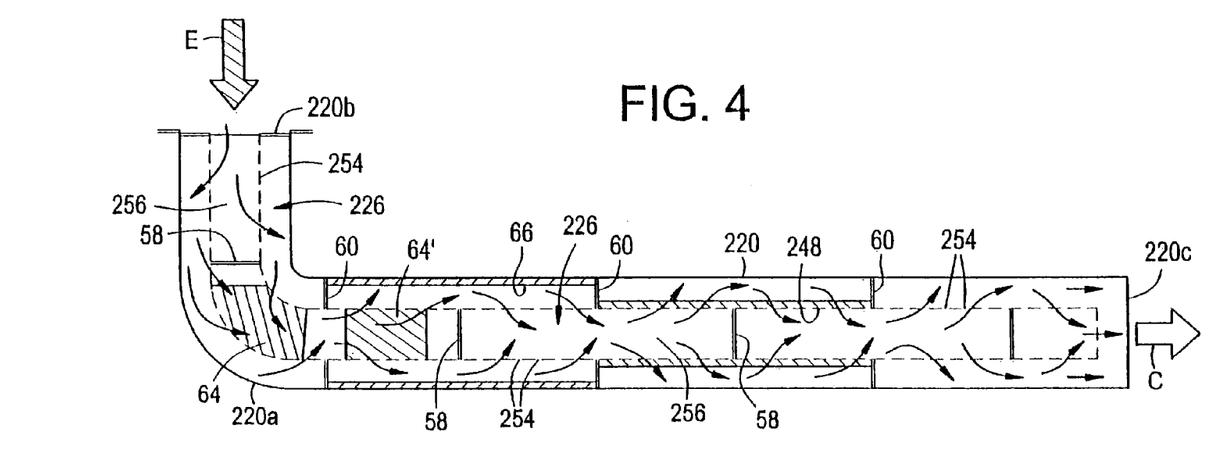
FIG. 4 is a schematic cross-sectional elevation view of a curved exhaust conduit having installed therein a conformable catalyst member comprising a pliable refractory metal carrier which includes length of pliable tube, one or more annular baffles, one or more interior closures and a plug catalyst as components thereof in accordance with yet another embodiment of the present invention.

Referring now to FIG. 4 there is shown in schematic, cross-sectional elevation view, another embodiment of the present invention comprising an exhaust pipe 220 within which is disposed a conformable catalyst member 226 shown in dash outline as extending for substantially the entire length of exhaust pipe 220, conformable catalyst member 226 being comprised of a pliable refractory metal carrier capable of being bent to conform to the curved elbow 220a of exhaust pipe 220.

As suggested by the dash line rendition of conformable catalyst member 226, it has formed along the length thereof a plurality of perforations 254. Conformable catalyst member 226 defines a tube passageway 256 extending therethrough along the entire length thereof. A plurality of interior closures 58 are positioned along the length of conformable catalyst member 226 to close off tube passageway 256 to passage of gas therethrough, thereby forcing the gas through perforations 254, as described in more detail below. A series of annular baffles 60 is secured to the exterior of conformable catalyst member 226 at longitudinally spaced-apart points thereon. Annular baffles 60 close the annular portion of exhaust pipe 220 which is external of tube passageway 256 to continued gas flow therethrough, except via tube passageway 256.

Figure 4A:
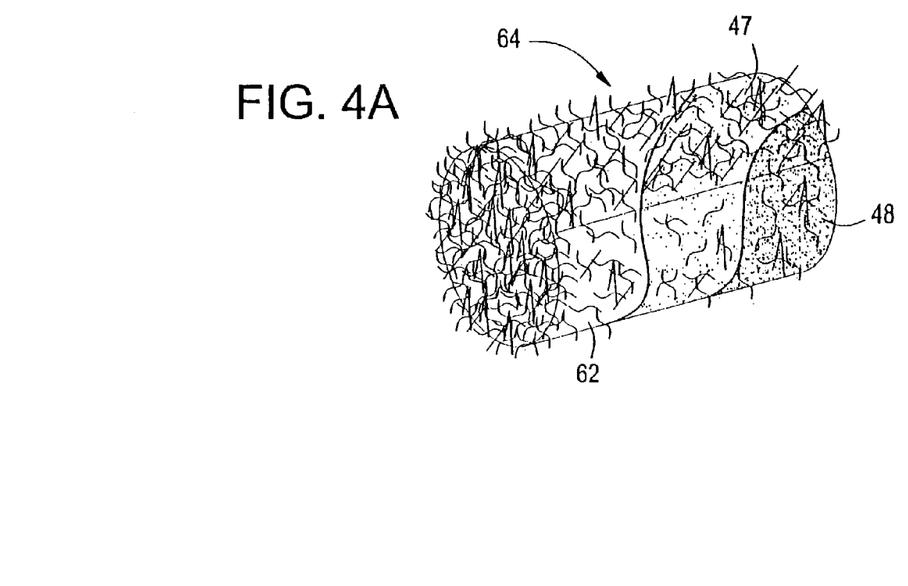
Figure 9:
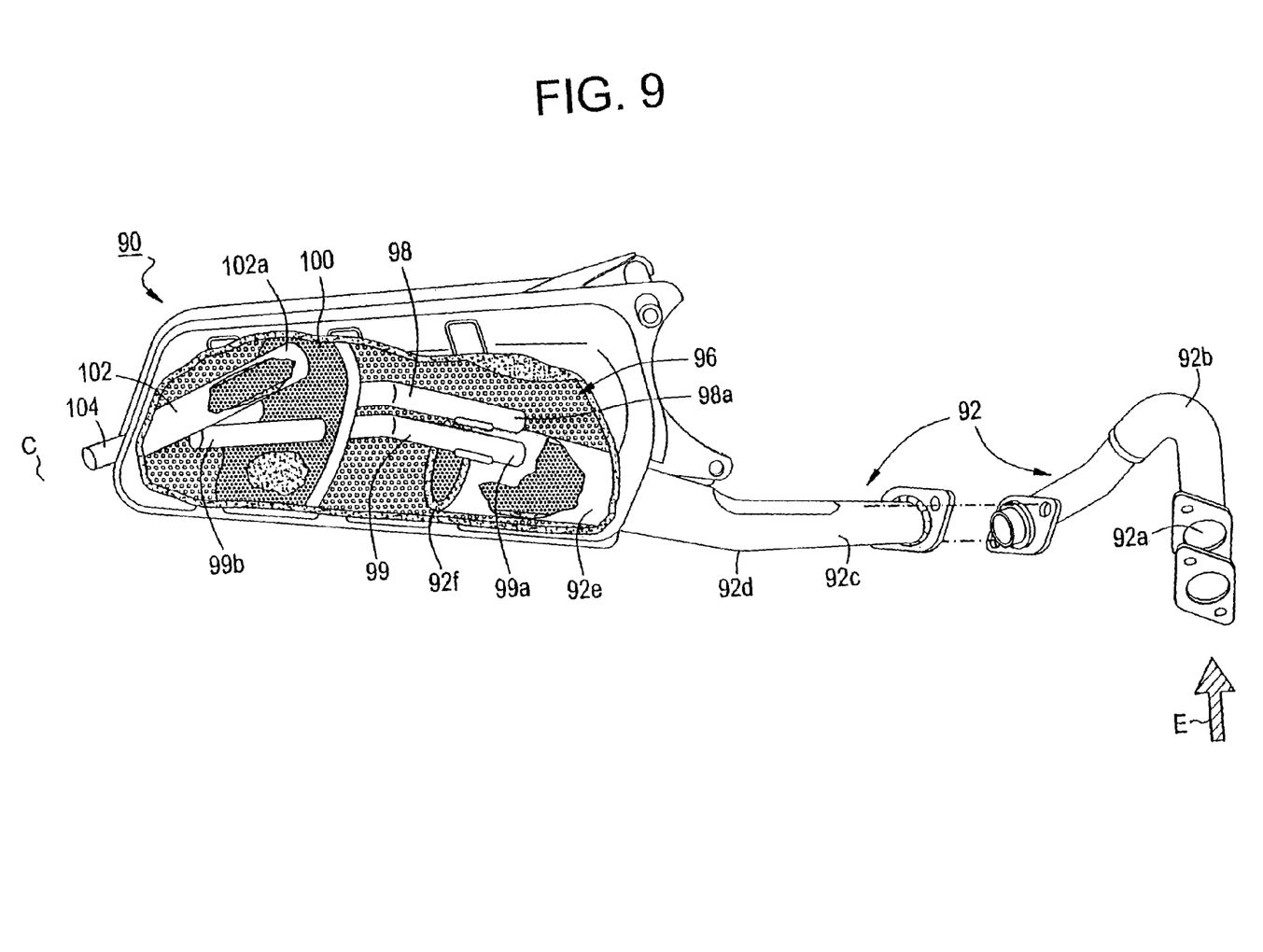
FIG. 9 is a perspective, exploded view, with parts broken away, of a conventional muffler and engine exhaust pipe for a two-stroke motorcycle engine.

FIG. 4A shows in perspective view a pliable plug carrier 62 which comprises a pliable metal foam having coated thereon an anchor layer 47 over which is coated a catalytic coating 48 to provide a pliable plug catalyst member 64. As shown in FIG. 4, a pair of pliable plug catalyst members 64, 64' is disposed in longitudinally spaced-apart positions within tube passageway 256. The first plug catalyst member 64 is bent to accommodate the curved elbow 220a, whereas the second plug catalyst member 64', which is disposed in a straight section of exhaust pipe 220, is in an unbent condition. If, however, conformable catalyst member 226 is to be inserted into exhaust pipe 220 through inlet 220b thereof, the ability of the second plug catalyst member 64' to bend during its passage through curved elbow 220a enables, or at least facilitates, assembly of the device. If conformable catalyst member 226, is to be inserted from discharge end 220c of exhaust pipe 220, then the second plug catalyst member 64' could conveniently be a rigid, non-pliable plug catalyst member, as it would not have to traverse a curved portion of exhaust pipe 220. It will be appreciated that some exhaust pipes, such as the inlet portion of the exhaust pipe 92 illustrated in FIG. 9, are curved in such a way that bending of the conformable catalyst member occurs regardless of the direction from which it is inserted into the exhaust pipe. Plug catalyst members 64 and 64' are gas-permeable and made of a pliable metal foam of known type which may have a catalytic coating 48 and, optionally, an anchor layer 47 applied thereto.

An exhaust pipe catalytic coating 66 may be applied to a portion (as illustrated) or the entirety of the interior surface of exhaust pipe 220. In the illustrated embodiment, exhaust pipe catalytic coating 66 extends between a pair of annular baffles 60 within which second plug catalyst member 64' is contained. An interior catalytic coating 248 is applied to the interior of conformable catalyst member 226 between a pair of annular baffles 60 downstream (as sensed in the direction of gas flow) of the location of second plug catalyst 64'. An anchor layer (not shown in FIG. 4) may be coated on the interior of the pliable refractory metal carrier (unnumbered in FIG. 4) of which conformable catalyst member 226 is comprised, between the pliable refractory metal carrier member and interior catalytic coating 248. A catalytic coating and optional anchor layer may also be applied over other portions, or the entirety, of the inside and outside surfaces of conformable catalyst member 226.

In use, as indicated by arrow E in FIG. 4, an exhaust, such as the exhaust of an internal combustion engine, enters exhaust pipe 220 at inlet 220b thereof and, as indicated by the smaller unnumbered arrows in FIG. 4, enters tube passageway 256 and flows outwardly through perforations 254 formed therein, being diverted out of tube passageway 256 by the first of a series of interior closures 58. The first of the series of annular baffles 60 redirects the gas flow through perforations 254 back into passageway 256 and through the gas-permeable, first pliable plug catalyst member 64. As indicated by the unnumbered arrows, the gas then flows through second plug catalyst member 64' and continues to be forced into a serpentine flow path into and out of tube passageway 256 via perforations 254 by the placement of interior closures 58 and annular baffles 60. This serpentine flow path forces the exhaust into contact with exhaust pipe catalytic coating 66 and interior catalytic coating 248 of conformable catalyst member 226. As indicated above, other portions or the entirety of both the interior and exterior surfaces of conformable catalyst member 226 and the interior surface of exhaust pipe 220 may optionally be coated with one or more suitable catalytic materials. The catalytically contacted gas, which undergoes well-known pollution abatement reactions by contacting the one or more catalytic coatings, emerges, as indicated by the arrow C, from discharge end 220c of exhaust pipe 220 as a cleaned exhaust.

Figure 5:
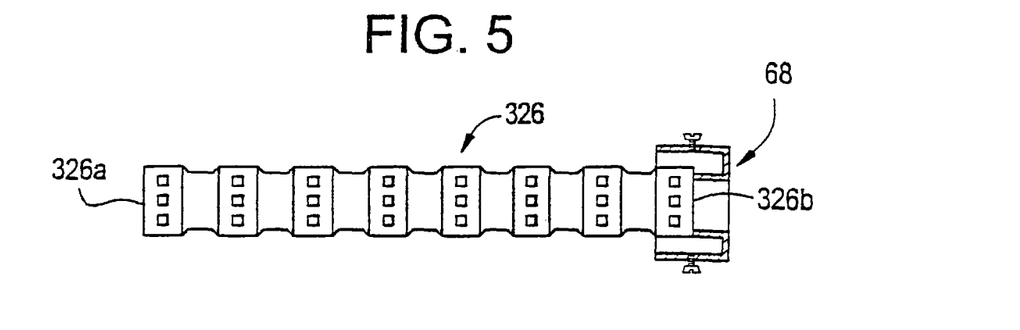
FIG. 5 is a side view in elevation of a conformable catalyst member comprised of a pliable refractory metal carrier having a mounting flange secured to the proximal end thereof.
Figure 5A:
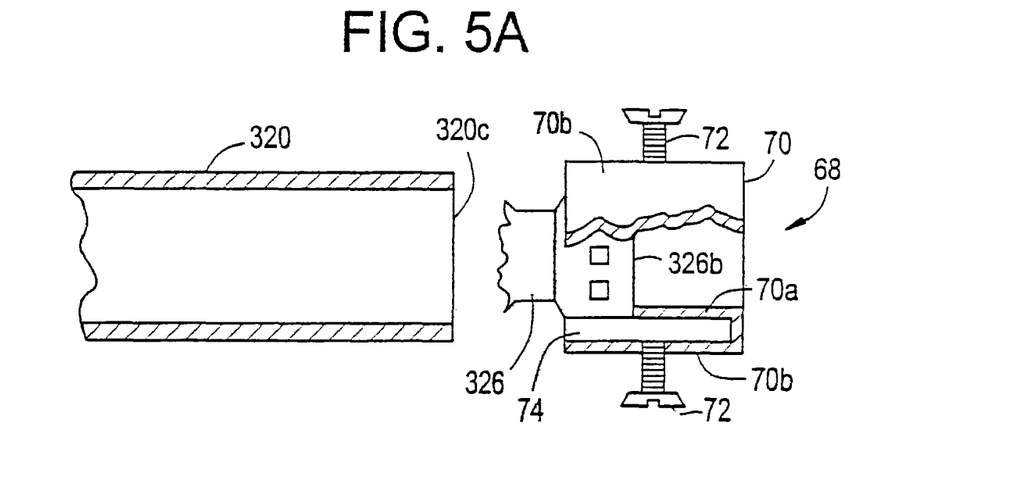
FIG. 5A is an elevation view, partly in cross section and enlarged relative to FIG. 5, of the proximal end of the conformable catalyst of FIG. 5, with parts broken away, juxtaposed to the open discharge end of a pipe in which the conformable catalyst member is to be mounted.
Figure 5B:
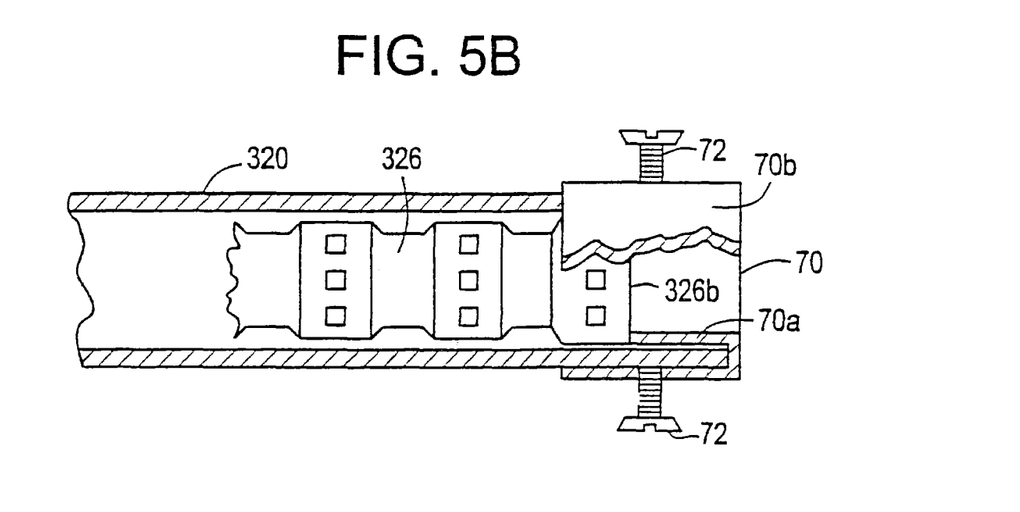
FIG. 5B is a view corresponding to FIG. 5A, but showing the conformable catalyst member mounted within the pipe.

While conformable catalyst members in accordance with the present invention may be installed and mounted within an exhaust pipe in any convenient manner and utilizing any convenient mounting means, a particular embodiment of a mounting member which may be secured to the open end of an exhaust pipe is illustrated in FIGS. 5-5B, wherein there is shown a conformable catalyst member 326 having a distal end 326a and an opposite proximal end 326b to which is secured a mounting member 68. As best seen in FIGS. 5A and 5B, mounting member 68 is comprised of an annular collar 70 of double-wall construction, inner annular wall 70a being shorter than outer annular wall 70b and being secured, as by welding, to proximal end 326b of conformable catalyst member 326. An annular slot 74 is formed between inner annular wall 70a and outer annular wall 70b and, as shown in FIGS. 5A and 5B, is dimensioned and configured to be received over discharge end 320c of exhaust pipe 320. Outer annular wall 70b has formed therein threaded holes to receive mechanical fasteners comprising, in the illustrated embodiment, a pair of diametrically opposite set screws 72. Mounting member 68 enables the insertion of conformable catalyst member 226 into the open discharge end 320c of exhaust pipe 320, which insertion is continued until discharge end 320c is received fully within annular slot 74 as shown in FIG. 5B. During this insertion, set screws 72 are in a backed-off position, or removed from mounting member 68, so as not to interfere with discharge end 320c being received within annular slot 74. When discharge end 320c is fully seated within annular slot 74 as illustrated in FIG. 5B, set screws 72 are tightened to secure conformable catalyst member 326 in place within exhaust pipe 320. If desired, holes or recesses (not shown) may be formed in the vicinity of discharge end 320c in alignment with the position of set screws 72 when mounting member 68 is fully received on exhaust pipe 320 as shown in FIG. 5B. In this way, set screws 72 may penetrate into or through the wall of exhaust pipe 320, to provide a stronger connection.

It will further be appreciated that if exhaust pipe 320 has a curved portion (not shown in FIG. 5A or 5B) through which distal end 326a of conformable catalyst member 326 must pass, conformable catalyst member 326 will bend to conform to the curved portion or portions. It will further be appreciated that in those cases where so much of exhaust pipe 320 as will receive conformable catalyst member 326 is straight, conformable catalyst member 326 may be replaced by a rigid, tube-like catalyst member. Therefore, mounting member 68 or an equivalent structure may be secured to the proximal end of either a conformable catalyst member, such as conformable catalyst member 326, or to the proximal end of a rigid catalyst member in cases where bending of the catalyst member to conform to a curved portion is not required. The rigid catalyst member may be, for example, identical or similar in shape to conformable catalyst member 326 except that it is rigid instead of pliable, i.e., conformable.

Referring now to FIG. 6, there is illustrated another embodiment of the present invention wherein the pliable refractory metal carrier comprises a metal strip 76 having a plurality of perforations 78 formed therein. A portion of metal strip 76 is shown folded into accordion pleats 80. Metal strip 76 has an anchor layer 47 applied thereto over which a catalytic coating 48 is applied to provide a conformable catalyst member 82. The presence of optional anchor layer 47 adheres catalytic coating 48 more firmly to metal strip 76 so that when the catalyst-coated metal strip is folded to form accordion pleats 80, catalytic coating 48 adheres thereto and does not spall therefrom. As best seen in FIG. 6A, perforations 78 are hole-punched through metal strip 76, with alternate perforations being punched from opposite sides of metal strip 76 so that rough-edged protrusions 78a extend from both opposite sides 76a and 76b (FIG. 6A) of metal strip 76. Metal strip 76 is thus configured somewhat like the surface of a cheese grater with "craters" formed by protrusions 78a extending in a regular pattern from both sides thereof.

Figure 7:
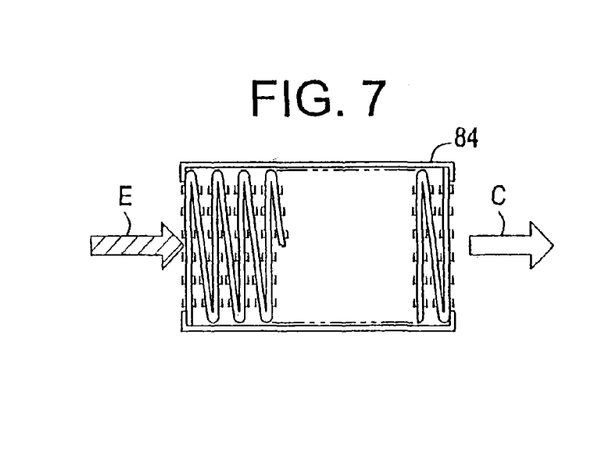
FIG. 7 is an elevation view showing the completed conformable catalyst member of FIG. 6 mounted within a retaining bracket.

In this embodiment, conformable catalyst member 82 is capable of being bent or deformed to form accordion pleats 80 and may be retained in that position by being mounted within a support frame 84 (FIG. 7) to maintain the accordion-pleated shape of conformable catalyst member 82. The assembly provided by conformable catalyst member 82 within support frame 84 may be placed in the gas flow path of an exhaust. As indicated by arrow E in FIG. 7, an engine exhaust flows through the perforations 78 (FIG. 6) in contact in a series of fine, thin streams of the exhaust gas, provides intimate contact of the exhaust gas with the catalytic coating 48 of conformable catalyst member 82 to promote reactions to convert noxious components of the exhaust gas, such as unburned hydrocarbons, carbon monoxide and/or nitrogen oxides, to convert them to innocuous substances such as $H_2O$, $CO_2$ and/or $N_2$. The perforations 78 may be punched under conditions to provide a desired height of the craters-like protrusions 78a of the punched-out metal, which protrusions serve to both increase catalytic gross surface area and act as spacers to provide a minimum space between individual accordion pleats 80, even when the accordion pleats are formed as tightly as possible without crushing protrusions 78a. Larger spacing between accordion pleats 80 may, of course, be used. The provision of spacing between adjacent accordion pleats 80 facilitates flow of the exhaust gas through the perforations 78 and increases the amount of contact of the exhaust with catalytic coating 48.

Figure 8:
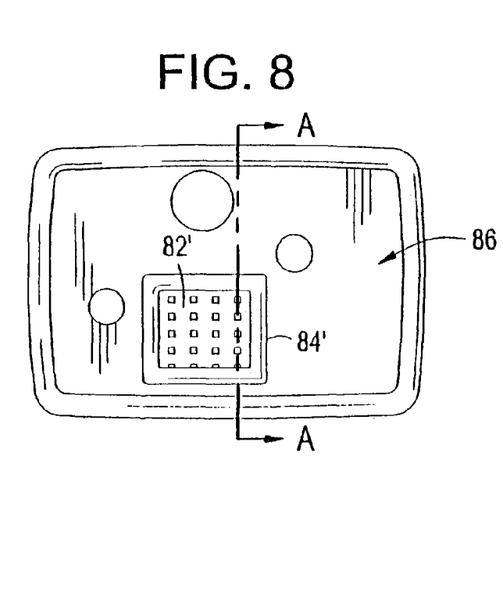
FIG. 8 is a front elevation view of a closure plate having an accordion-pleated conformable catalyst member in accordance with another embodiment of the invention mounted thereon.
Figure 8A:
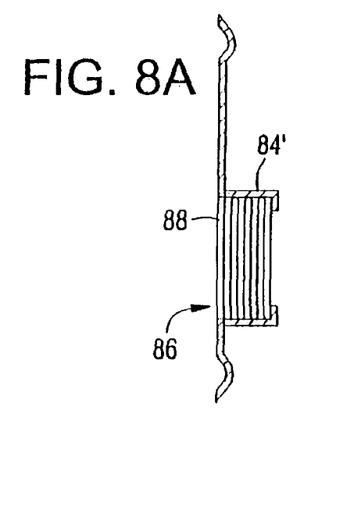
FIG. 8A is a cross-sectional view taken along line A-A of FIG. 8.

FIGS. 8 and 8A show a muffler plate 86 of otherwise conventional construction which has a rectangular aperture 88 (FIG. 8A) formed therein. A support frame 84' is positioned about the periphery of rectangular aperture 88 and contains therewithin a conformable catalyst member 82' having the same accordion pleat construction illustrated with respect to conformable catalyst member 82 of FIG. 7. As shown in FIG. 8A, the exhaust gas containing pollutants is flowed through conformable catalyst member 82 in the direction indicated by the arrow E and contacts a catalytic coating (not numbered in FIGS. 8 and 8A) such as catalytic coating 48 of FIG. 6, in order to purify the exhaust by eliminating or reducing the amount of noxious pollutants therein by promoting chemical reactions of noxious pollutants to innocuous substances. The cleaned exhaust gas emerges from conformable catalyst member 82 as indicated by the arrow C in FIG. 8A. Muffler plate 86 is of the type often found in utility engines such as chain saw engines and electric generator engines such as engine 32 of FIG. 2.

Referring now to FIG. 9, there is shown a typical muffler 90 and exhaust pipe 92 of the type often used for a two-stroke motorcycle engine. Exhaust E enters at the inlet end 92a of exhaust pipe 92 passes through curved portion 92b thereof, thence through straight portion 92c and bent portion 92d, and into outwardly (in the discharge direction) flared portion 92e. The exhaust gases exit through outlet portion 92f into muffler housing 94 within an envelope 96 of sound-deadening material which is contained within housing 94 and encloses discharge end 92f. A pair of bent, internal shunt tubes 98, 99 are disposed within envelope 96 and penetrate an internal barrier 100 made of a sound-deadening material similar or identical to that of envelope 96. A discharge tube 102 extends from within envelope 96 and emerges from housing 94 via outlet port 104.

In use, exhaust gas E passes via inlet end 92a through exhaust pipe 92 and out discharge end 92f thereof to within envelope 96. The exhaust then enters respective inlet ends 98a, 99a of shunt tubes 98, 99 and exits through the outlet ends thereof, only one of which, outlet end 99b, is visible in FIG. 9. The exhaust gas emerges from the outlet ends of shunt tubes 98, 99, passes into the inlet end 102a of discharge tube 102 and flows therethrough to outlet port 104 thereof. This known construction serves to deaden the sound of the engine, as is well known to those skilled in the art. In order to provide or supplement catalytic treatment of the exhaust gas E, one or more conformable catalyst members in accordance with the present invention may be inserted, for example, within curved portion 92b of exhaust pipe 92. Such conformable catalyst member may extend for a distance on opposite sides of curved portion 92b, e.g., to or beyond bent portion 92d. Alternatively, another conformable catalyst member in accordance with the present invention may be passed through bent portion 92d of exhaust pipe 92. Conformable catalyst members in accordance with the present invention may be also inserted into the bent shunt tubes 98, 99 and/or in discharge tube 102. The conformable catalyst members are not shown in FIG. 9, which simply serves to illustrate a typical environment of use thereof. As illustrated in FIG. 4, additional catalysts may be provided by coating all or portions of the interior of exhaust pipe 92, of shunt tubes 98, 99 and/or of discharge tube 102. In addition, conventional rigid catalyst members may be inserted in straight segments of exhaust pipe 92. A conformable catalyst member, such as conformable catalyst member 226 of FIG. 4, having interior closures, annular baffles and perforations (such as interior closures 58, annular baffles 60 and perforations 54 of the FIG. 9 embodiment), may be employed within exhaust pipe 92.

While the invention has been described in detail with respect to specific preferred embodiments thereof, it will be apparent to those skilled in the art that other embodiments lie within the scope of the invention and the appended claims.

What is claimed is:

1. A conformable catalyst member comprising a refractory metal pliable carrier comprising a tube of corrugated construction, the tube having an elongate body portion which is dimensioned and configured to be mounted in a curved or bent configuration along its length within a bent or curved portion of an exhaust pipe having an open discharge end, the pliable carrier having coated thereon an intermetallic anchor layer having a catalytic coating applied thereto which remains intact on the carrier when the conformable catalyst member is bent along its length and mounted within a bent or curved portion of an exhaust pipe.

2. The catalyst member of claim 1 having a plurality of perforations formed around the periphery of the tube.

3. The catalyst member of claim 1 having a catalytic coating on the anchor layer to provide a conformable catalyst member.

4. The catalyst member of claim 1, wherein the tube of corrugated construction comprises alternating rings separated by annular webs.

5. The catalyst member of claim 1 wherein the anchor layer is electric arc sprayed.

6. The catalyst member of claim 1 wherein the intermetallic anchor layer is selected from the group consisting of nickel, Ni/Cr/Al/Y, Co/Cr/Al/Y, Fe/Cr/Al/Y, Co/Ni/Cr/Al/Y, Fe/Ni/Cr, Fe/Cr/Al, Ni/Cr, Ni/Al, 300 series stainless steels, 400 series stainless steels, Fe/Cr and Co/Cr, and mixtures of two or more thereof.

7. The catalyst member of claim 1, the carrier having a distal end and a proximal end, the proximal end comprising a mounting member dimensioned and configured to be secured to the open discharge end of the pipe when the body portion of the carrier is disposed within the pipe.

8. The catalyst member of claim 7 wherein the mounting member comprises an annular collar defining a mounting flange which is disposed radially outwardly of the proximal end of the catalyst member and extends in the direction from the proximal end towards the distal end thereof, whereby to define between the mounting flange and the proximal end of the catalyst member an annular slot which is dimensioned and configured to receive therein the open discharge end of the pipe, when the body portion of the carrier is disposed within the pipe.

9. The catalyst member of claim 8 having a catalytic material coated on at least some of the body portion of the carrier.

10. A catalyst member for treating noxious components of engine exhaust gas comprising a pliable refractory metal carrier comprising a plurality of perforated plate members having opposite faces and disposed in a face-to-face linear array to impart a cylindrical shape having a length to the carrier and to form accordion pleats, the plate members having protrusions extending from their faces which space adjacent plate members from each other, the carrier having coated thereon an intermetallic anchor layer and a catalytic coating, the catalyst member being conformable along its length such that when placed in a bent or curved configuration to provide intimate contact of the exhaust gas with the catalytic coating of conformable catalyst member to promote reactions to convert noxious components of the exhaust gas, the catalytic coating remains intact on the carrier.

11. The catalyst member of claim 10, wherein the intermetallic anchor layer is selected from the group consisting of nickel, Ni/Cr/Al/Y, Co/Cr/Al/Y, Fe/Cr/Al/Y, Co/Ni/Cr/Al/Y, Fe/Ni/Cr, Fe/Cr/Al, Ni/Cr, Ni/Al, 300 series stainless steels, 400 series stainless steels, Fe/Cr and Co/Cr, and mixtures of two or more thereof.

12. A catalytic assembly comprising the conformable catalyst member of claim 1 disposed within a bent or curved portion of an exhaust pipe having an open discharge end.

13. The catalytic assembly of claim 12, wherein the intermetallic anchor layer is electric arc sprayed.

14. The catalytic assembly of claim 12, wherein the intermetallic anchor layer is selected from the group consisting of nickel, Ni/Cr/Al/Y, Co/Cr/Al/Y, Fe/Cr/Al/Y, Co/Ni/Cr/Al/Y, Fe/Ni/Cr, Fe/Cr/Al, Ni/Cr, Ni/Al, 300 series stainless steels, 400 series stainless steels, Fe/Cr and Co/Cr, and mixtures of two or more thereof.

15. The catalytic assembly of claim 12, the carrier having a distal end and a proximal end, the proximal end comprising a mounting member dimensioned and configured to be secured to the open discharge end of the exhaust pipe when the body portion of the carrier is disposed within the exhaust pipe.

16. The catalytic assembly of claim 15, wherein the mounting member comprises an annular collar defining a mounting flange which is disposed radially outwardly of the proximal end of the catalyst member and extends in the direction from the proximal end towards the distal end thereof, whereby to define between the mounting flange and the proximal end of the catalyst member an annular slot which is dimensioned and configured to receive therein the open discharge end of the exhaust pipe, when the body portion of the carrier is disposed within the exhaust pipe.

17. The catalytic assembly of claim 12, having a plurality of perforations formed around the periphery of the carrier tube.

18. The catalytic assembly of claim 17, wherein the conformable catalyst member comprises a plurality of interior closures to prevent passage of exhaust therethrough and force passage of the exhaust out through the carrier tube perforations, and wherein the exhaust pipe comprises a series of interior annular baffles to prevent passage of exhaust therethrough and force passage of the exhaust in through the carrier tube perforations.

* * * * *